US008733384B2

(12) United States Patent
Ersoy et al.

(10) Patent No.: US 8,733,384 B2
(45) Date of Patent: May 27, 2014

(54) INTERNAL PRESSURE BOOST SYSTEM FOR GAS UTILITY PIPELINES

(75) Inventors: Daniel Allen Ersoy, Lincolnwood, IL (US); Daniel Thomas Germata, Waukegan, IL (US)

(73) Assignee: Gas Technology Institute, Des Plaines, IL (US)

( * ) Notice: Subject to any disclaimer, the term of this patent is extended or adjusted under 35 U.S.C. 154(b) by 692 days.

(21) Appl. No.: 12/913,801

(22) Filed: Oct. 28, 2010

(65) Prior Publication Data

US 2012/0103429 A1 May 3, 2012

(51) Int. Cl.
*G05D 11/00* (2006.01)

(52) U.S. Cl.
USPC ............................ 137/114; 137/111; 137/896

(58) Field of Classification Search
CPC ............................ G05D 11/00; G05D 11/006
USPC .......... 137/7, 12, 13, 14, 87.04, 87.05, 87.06, 137/100, 110, 111, 114, 565.13, 895, 896, 137/897, 898; 48/191
See application file for complete search history.

(56) References Cited

U.S. PATENT DOCUMENTS

| | | | | |
|---|---|---|---|---|
| 2,676,876 | A * | 4/1954 | Mosely | 48/190 |
| 3,653,394 | A * | 4/1972 | McJones | 137/114 |
| 3,735,778 | A * | 5/1973 | Garnier | 137/896 |
| 4,192,655 | A * | 3/1980 | von Linde | 48/191 |
| 4,250,908 | A * | 2/1981 | Velie | 137/7 |
| 4,468,127 | A * | 8/1984 | Agosta | 366/160.1 |
| 5,143,111 | A * | 9/1992 | Durbin | 137/100 |
| 5,551,472 | A * | 9/1996 | McBrayer et al. | 137/114 |
| 2007/0163649 | A1* | 7/2007 | Yamagishi et al. | 137/114 |

* cited by examiner

*Primary Examiner* — John Fox
*Assistant Examiner* — Kevin Murphy
(74) *Attorney, Agent, or Firm* — Pauley Petersen & Erickson

(57) ABSTRACT

A method and system for boosting pipeline gas pressure in a low-pressure gas pipeline in which a supplemental gas supply pipe in fluid communication with a supplemental pipeline gas supply is provided to an interior of a gas pipeline containing a pressurized pipeline gas, where the pressure of the supplemental pipeline gas supply is greater than the pressure of the pressurized pipeline gas. The gas pressure differential between the pressurized pipeline gas and the supplemental pipeline gas supply pressure is measured. When the pressure differential reaches a certain predetermined set value, supplemental pipeline gas is provided from the supplemental pipeline gas supply through the supplemental gas supply pipe into a pipeline space between the gas pipeline and the supplemental gas supply pipe. The flow of supplemental pipeline gas is halted upon achievement of a second predetermined set differential pressure.

12 Claims, 2 Drawing Sheets

INTERNAL PRESSURE BOOST SYSTEM FOR GAS UTILITY PIPELINES

BACKGROUND OF THE INVENTION

1. Field of the Invention

This invention relates to a method and system for boosting the internal pressure of pressurized pipelines. In one aspect, this invention relates to a method and system for boosting the internal pressure of pressurized pipelines from inside the pressurized pipelines.

2. Background of the Invention

In the United States today, there are thousands of miles of gas pipelines that are unable to increase pressure to increase capacity to meet the increases in demand for the gas. Low pressure gas pipelines are particularly susceptible to this problem. By low pressure gas pipelines, we mean gas pipelines in which the gas pressure is in the range of inches of water column to about 2 psig. Cast iron pipeline systems are in some of the most densely populated locations in the United States. For example, in the northeastern United States, some of the largest local distribution companies (LDCs) have low pressure cast iron distribution mains that supply some of the nation's largest urban populations. These areas also have "fuel oil" (e.g. No. 4/6 fuel oil) burning boiler heating units for residential and commercial customers.

As the push to greener fuels now offers incentives at all levels to switch to a "cleaner" burning fuel, such as natural gas, the demand on the distribution mains increases. In addition, new uses of natural gas, such as for residential and commercial standby power generation, further increase the demand on the distribution mains. Unfortunately, the current low pressure systems already operate at their maximum pressure rating. This pressure rating cannot be increased as the entire system is designed to be of the same pressure required to safely operate end-use appliances. High end-use demand results in local low pressures in the gas main that can cause inadvertent shutdown of appliances. This increase in demand can especially occur during peak hours such as in the morning when hot water heater use is very high and/or after the workday during the winter months when heating/furnace system use is at its peak.

Accordingly, there is a need for a simple and automatic system that can provide a local boost gas supply (at one or multiple locations) when needed without substantially increasing the overall pressure of the system. It would be of particular benefit if the system could provide boosts in "zones" along the length of the gas main where the draw off of gas is greatest.

At present, there are no known systems in existence that completely solve this problem without major changes or wholesale replacement of the distribution pipeline. Current options include a complete tear out or abandonment of the current low pressure system and replacement with a high-pressure, regulated system and lining of the low pressure pipe with a structural liner that will support a higher pressure. The first option generally requires all service lines to be replaced and taps to be installed along with the service lines, which is either prohibitively expensive or logistically impossible. The second option has issues with bridging sharp bends, mechanical couplings, and non-full bore openings and is an expensive process that requires a very thorough cleaning prior to lining, an expensive process to reattach taps, and regulators at each residence and, possibly, replacement of the service lines to handle the higher pressures.

SUMMARY OF THE INVENTION

Accordingly, it is one object of this invention to provide a system that can provide a local boost gas supply (at one or multiple locations) into a pipeline when needed without substantially increasing the overall pressure of the system.

It is another object of this invention to provide a system for boosting the pressure of gas pipelines in "zones" along the length of the gas pipeline where the draw off of gas is greatest.

These and other objects of this invention are addressed by a system for boosting the pressure of pressurized pipeline gases comprising a host pipeline containing a pressurized pipeline gas and a boost pipe disposed within the host pipeline and forming an annular region between the boost pipe and the host pipeline. The boost pipe containing a supplemental pipeline gas having a higher pressure than the pressurized pipeline gas is connected with a supplemental pipeline gas supply. At least one pressure sensor adapted to measure a differential pressure between the pressurized pipeline gas and the supplemental pipeline gas is disposed within the host pipeline. Flow control means are provided for initiating a flow of the supplemental pipeline gas from the boost pipe into the annular region at a first set differential pressure and for shutting off the flow of the supplemental pipeline gas at a second set differential pressure. While intended for use in low pressure gas pipelines, in which the consequences of increased demand are particularly acute, the method and apparatus of this invention may be applied to any pressurized gas-conveying pipes or pipelines, such as for conveying other gases such as hydrogen, so long as the pressure in the boost pipe can be maintained above the pressure in the pressurized gas-conveying pipeline without affecting the physical state of the gas. Gas-conveying pipes or pipelines having gas pressures up to about 150 psig are particularly suitable for application of the method and apparatus of this invention.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

The fundamental concept of this invention involves the boosting of gas pressure in a pressurized gas main or pipeline on an as-needed basis from within the pressurized gas main or pipeline. The basic components of a system for implementation of this concept comprise a pressurized pipeline gas source providing a supplemental pressurized pipeline gas having a pressure greater than the pressure of the pipeline gas within the pressurized gas pipeline to which the concept is applied, delivery means for delivery of the supplemental pressurized pipeline gas from the pressurized pipeline gas source to the inside of the pressurized gas pipeline, pressure sensing means for sensing the pressure of the pipeline gas in the pressurized gas main or pipeline and the supplemental pressurized pipeline gas and determining the pressure differential between the pipeline gas pressure and the supplemental pressurized pipeline gas pressure, and flow control means for controlling the flow of supplemental pressurized pipeline gas into the pressurized gas pipeline. Although described herein using specific system components for performance of the interior pipeline pressure boosting method of this invention, it will be apparent that there are a number of different system components which may be employed for the same functions described herein, and such different system components, although not specifically described herein, are deemed to be within the scope of this invention. For example, the pressure sensors may be integral with the flow control means or they may be separate and remote from each other and linked for two-way feedback by pneumatic/pressure, electrical, or mechanical connection.

Figure 1:
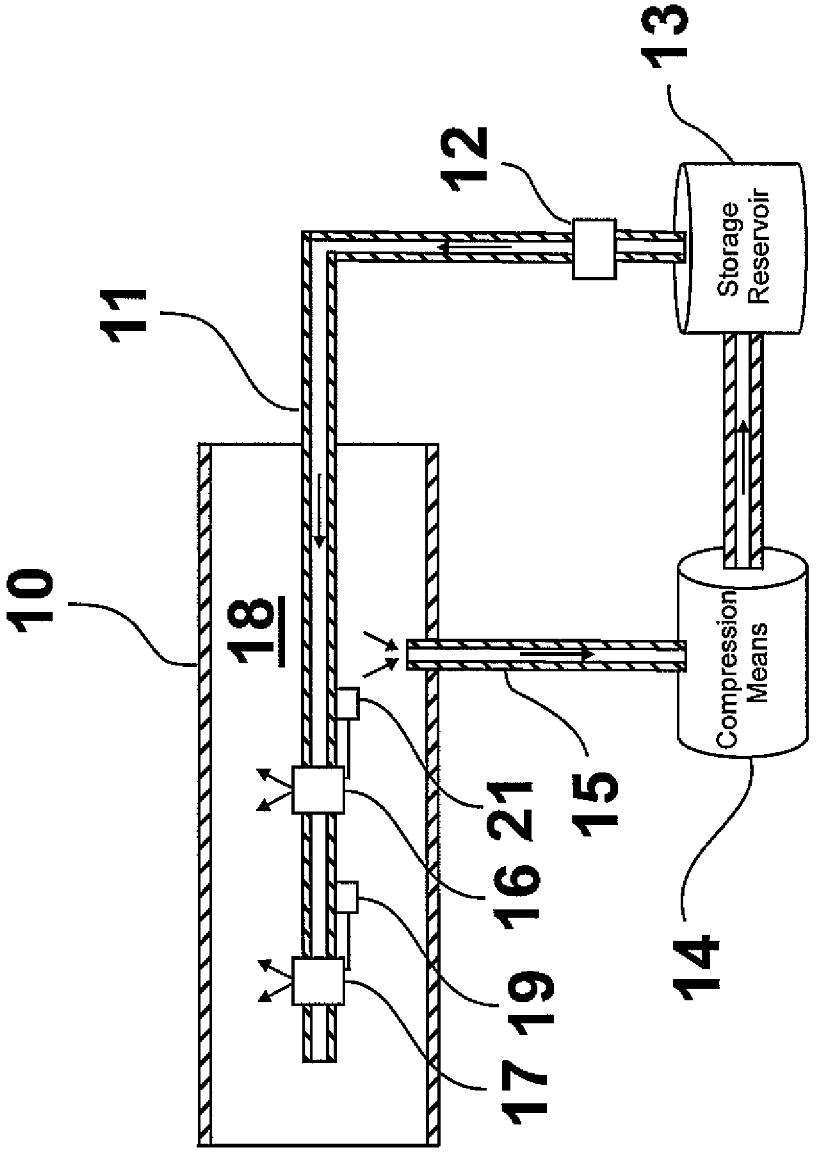
FIG. 1 is a schematic diagram of a pressure boost system in accordance with one embodiment of this invention.

As shown in FIG. 1, the system for boosting the pipeline gas pressure in a pressurized gas main or pipeline comprises a boost pipe 11 disposed within a pressurized host pipeline 10 containing pressurized pipeline gas, forming an annular region 18 between the boost pipe and the host pipeline for receiving the supplemental pipeline gas. Boost pipe 11, containing pressurized supplemental pipeline gas having a gas pressure greater than the pipeline gas pressure in the pressurized host pipeline, is connected with a storage reservoir 13 in which the pressurized supplemental pipeline gas is stored at pressure until such time as it is needed for boosting the pressure within the pressurized host pipeline. The length of the boost pipe within the host pipe may be varied as needed. The far end of the boost pipe, away from the pressurized supplemental gas source, may be terminated with a simple end cap or other pipe termination means for closing off the pipe end.

The principle of operation of the system of this invention involves monitoring of the differential pressure between the pressurized pipeline gas in the lower pressure pressurized host pipeline and the higher pressure pressurized supplemental pipeline gas disposed within the boost pipe or supplemental pipeline gas source such that, when the pressure differential reaches a predetermined maximum value, which corresponds to a lower than desired pipeline gas pressure in the host pipe, actions take place to increase the pipeline gas pressure in the host pipe by introducing the supplemental pipeline gas disposed within the boost pipe into the annular space in the host pipe, i.e. lower pressure gas main or pipeline, until the differential pressure reaches a predetermined value less than the predetermined maximum value, at which point the flow of supplemental pipeline gas from the boost pipe is halted.

Figure 2:
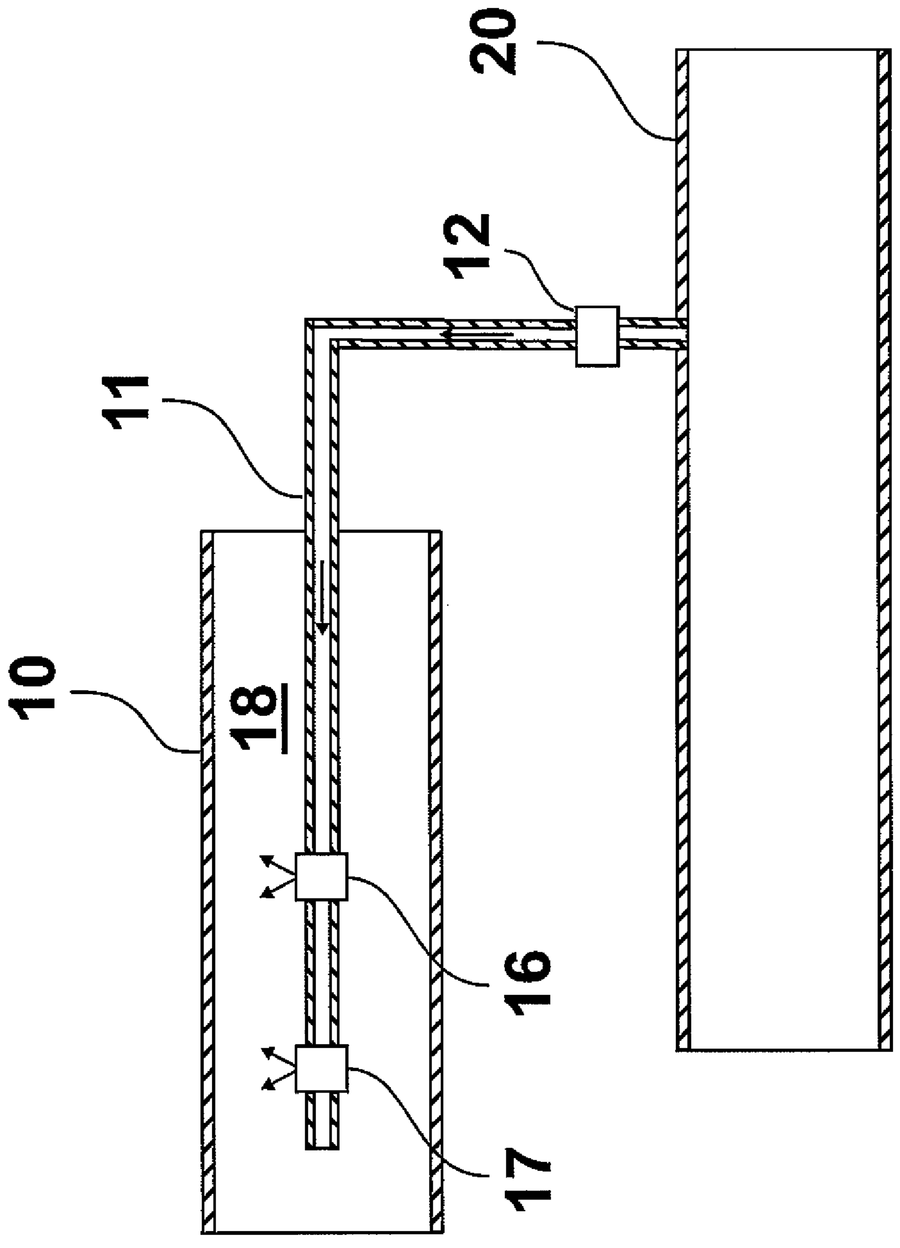
FIG. 2 is a schematic diagram of a pressure boost system in accordance with another embodiment of this invention.

Differential pressure may be determined by a variety of sensing means. In accordance with one embodiment of this invention, differential pressure may be measured by one or more differential pressure sensors 19, 21. In accordance with another embodiment, the differential pressure may be measured by pressure sensors measuring the pressurized pipeline gas pressure and the supplemental pipeline gas pressure separately, each of which sensors is operably connected with a signal receiver in which differential pressure is determined. In accordance with one preferred embodiment as shown in FIG. 2, the differential pressure sensors are integrated with flow control means 16, 17 positioned in the annular region 18 at periodic distances along the boost pipe. In accordance with one preferred embodiment of this invention, the flow control means comprises an excess flow valve used in a reverse mode of operation, referred to herein as a reverse mode excess flow valve. Conventionally, excess flow valves are used to regulate the flow of fluid therethrough by limiting the flow rate to a predetermined maximum value. These valves remain open during normal use, when there is sufficient backpressure downstream from the valve, but will close when the downstream pressure falls below a predetermined value or disappears altogether. In the reverse mode excess flow valve employed in the method and system of this invention, the valve remains closed until such time as the differential pressure between the pipeline gas pressure and the supplemental pipeline gas pressure reaches a predetermined value, at which point the valve opens to permit the flow of supplemental pipeline gas from the boost pipe into the host pipe. In accordance with one embodiment of this invention, flow valves adapted to sense differential pressure and then use the signal generated by the differential pressure sensor to throttle the flow valve to port gas from the higher pressure boost pipe to the lower pressure host pipeline may be employed. In accordance with one embodiment of this invention, the reverse mode excess flow valve may be integral to the high pressure boost pipe, requiring no physical connection to the lower pressure host pipe.

In accordance with one embodiment of this invention in which the boost pipe 11 is a plastic pipe, the reverse mode excess flow valve may be combined with an electrofusion fitting into an integral unit that couples sections of the plastic boost pipe, provides the differential pressure sensing and delivery of supplemental pipeline gas, and provides a standoff, i.e. centering, feature of the unit from the bottom of the larger diameter host pipe.

In accordance with one embodiment of this invention as shown in FIG. 1, the supplemental pressurized pipeline gas may be provided to the boost pipe by way of a tap conduit 15 in fluid communication with the lower pressure host pipeline 10 through which pipeline gas is drawn off from the pipeline gas in the host pipeline during low pipeline gas demand (low load) periods and compressed by suitable compression means 14, such as a compressor. The compressed pipeline gas is then conveyed to a storage reservoir 13 in which it is stored, at a higher pressure than the lower pressure pipeline gas in the host pipeline until it is needed. During periods of high pipeline gas demand on the pressurized pipeline gas pipeline, the storage reservoir supplies gas through a flow control means such as excess flow valve 12 to the lower pressure pipeline gas pipeline 10. In accordance with one embodiment of this invention, a pressure regulator may be placed inline separately between the excess flow valve 12 and the storage reservoir 13 (not shown).

In accordance with one embodiment of this invention, as shown in FIG. 2, the source of higher pressure supplemental pipeline gas may be a separate high pressure distribution source, such as a steel or polyethylene gas main, located proximate the lower pressure pipeline gas pipeline. In this embodiment, the need for a pipe tap 15, compression means 14 and storage reservoir 13 is obviated. In addition, no electricity is required for operation of the system.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A system for boosting the pressure of pressurized pipeline gases comprising:

a host pipeline containing a pressurized pipeline gas;

a boost pipe disposed within said host pipeline and forming an annular region between said boost pipe and said host pipeline, said boost pipe containing a supplemental pipeline gas having a higher pressure than said pressurized pipeline gas;

a supplemental pipeline gas supply connected with said boost pipe;

at least one pressure sensor disposed within said host pipeline adapted to measure a differential pressure between said pressurized pipeline gas and said supplemental pipeline gas; and flow control means for initiating a flow of said supplemental pipeline gas from said boost pipe into said annular region at a first set differential pressure and for shutting off said flow of said supplemental pipeline gas at a second set differential pressure, said flow control means comprising a plurality of flow control valves disposed at periodic distances along said boost pipe and within said host pipeline, each said flow control valve adapted to provide fluid communication between an interior of said boost pipe and said annular region.

2. The system of claim 1, wherein said flow control means comprises at least one flow control valve disposed within said host pipeline adapted to provide fluid communication between an interior of said boost pipe and said annular region at said first set differential pressure and to interrupt said fluid communication at said second set differential pressure.

3. The system of claim 2, wherein said at least one pressure sensor is operably connected with said at least one flow control valve.

4. The system of claim 3, wherein said supplemental pipeline gas supply comprises a supplemental pipeline gas storage vessel having a supplemental pipeline gas outlet in fluid communication with said boost pipe and having a supplemental pipeline gas inlet in fluid communication with a tap opening formed by said host pipeline.

5. The system of claim 4 further comprising an excess flow valve having a supplemental pipeline gas supply valve inlet in fluid communication with said supplemental pipeline gas supply outlet of said supplemental pipeline gas storage vessel and having a supplemental pipeline gas supply valve outlet in fluid communication with said boost pipe.

6. The system of claim 4 further comprising supplemental pipeline gas compression means for compressing said supplemental pipeline gas exiting said tap opening.

7. The system of claim 4 further comprising pressure control means for regulating supplemental pipeline gas pressure of supplemental pipeline gas exiting said supplemental pipeline gas storage vessel.

8. The system of claim 3, wherein said supplemental pipeline gas supply comprises a high-pressure supplemental gas distribution pipeline proximate said host pipeline.

9. The system of claim 2, wherein said at least one pressure sensor is integral with said at least one flow control valve.

10. The system of claim 2, wherein said at least one flow control valve is a reverse mode excess flow valve.

11. The system of claim 1, wherein said boost pipe includes a terminated end disposed with said host pipeline.

12. The system of claim 1, comprising a plurality of said pressure sensors disposed within said host pipeline, said sensors adapted to measure a differential pressure between said pressurized pipeline gas and said supplemental pipeline gas.

* * * * *